United States Patent
Álvarez Granda

(10) Patent No.: US 11,130,637 B2
(45) Date of Patent: Sep. 28, 2021

(54) ROLLER TRANSMISSION FOR MESH TRACTION

(71) Applicant: COMPAÑÍA DE GALLETAS NOEL S.A.S., Medellín (CO)

(72) Inventor: Elkin de Jesús Álvarez Granda, Medellín (CO)

(73) Assignee: COMPAÑÍA DE GALLETAS NOEL S.A.S., Medellín (CO)

( * ) Notice: Subject to any disclaimer, the term of this patent is extended or adjusted under 35 U.S.C. 154(b) by 0 days.

(21) Appl. No.: 16/925,737

(22) Filed: Jul. 10, 2020

(65) Prior Publication Data

US 2021/0009356 A1    Jan. 14, 2021

(30) Foreign Application Priority Data

Jul. 10, 2019   (CO) .......................... NC2019/0007406

(51) Int. Cl.
| | |
|---|---|
| *B65G 23/06* | (2006.01) |
| *B65G 39/071* | (2006.01) |
| *B65G 15/64* | (2006.01) |
| *B65G 41/00* | (2006.01) |
| *B65G 15/62* | (2006.01) |

(52) U.S. Cl.
CPC ............. *B65G 23/06* (2013.01); *B65G 15/62* (2013.01); *B65G 15/64* (2013.01); *B65G 39/071* (2013.01); *B65G 41/002* (2013.01); *B65G 2207/30* (2013.01)

(58) Field of Classification Search
CPC ...... B65G 23/06; B65G 39/071; B65G 15/64; B65G 2207/30; B65G 17/064; B65G 15/62; B65G 41/002; B65G 21/10

USPC .................................................. 198/834–835
See application file for complete search history.

(56) References Cited

U.S. PATENT DOCUMENTS

| | | | | |
|---|---|---|---|---|
| 4,568,320 A | * | 2/1986 | Tangorra | F16H 55/171 474/152 |
| 4,685,557 A | * | 8/1987 | Roinestad | B65G 23/06 198/834 |
| 4,993,543 A | * | 2/1991 | Lapeyre | B65G 17/08 198/834 |
| 5,199,552 A | * | 4/1993 | Dauchez | B65G 23/06 198/834 |
| 5,630,500 A | * | 5/1997 | Conrad | B65G 15/42 198/833 |
| 5,806,662 A | * | 9/1998 | Martin | B65G 23/06 198/803.15 |
| 6,360,879 B1 | * | 3/2002 | Crawford | B65G 15/62 198/821 |
| 6,523,679 B1 | * | 2/2003 | Manchester | B65G 15/62 198/841 |
| 6,811,018 B2 | | 11/2004 | Cotter et al. | |
| 7,565,967 B2 | | 7/2009 | Maine, Jr. et al. | |

(Continued)

*Primary Examiner* — Mark A Deuble
(74) *Attorney, Agent, or Firm* — The Morales Law Firm; Joseph L. Morales

(57) ABSTRACT

The present invention refers to a conveyor belt comprising a drive roller with a constant section cylinder and conical tip teeth, a mesh type drive belt, wherein said holes coincide with the teeth of the drive roller and a sliding plate, the drive belt being supported on the sliding plate.

Wherein coupling between the drive belt and the teeth allows reducing longitudinal and transversal strain of the mesh type drive belt.

10 Claims, 6 Drawing Sheets

(56) References Cited

U.S. PATENT DOCUMENTS

2013/0233682 A1\* 9/2013 Werlinger .............. B65G 21/12
                                              198/861.2
2018/0319602 A1\* 11/2018 German ................ B65G 39/16
2019/0337724 A1\* 11/2019 Nishizawa ............ B65G 29/00
2021/0000081 A1\* 1/2021 Schwitters ............ B65G 17/42

\* cited by examiner

ROLLER TRANSMISSION FOR MESH TRACTION

FIELD OF INVENTION

The present invention is related to product transport systems in a production line. Specifically, the present invention is related to positive belt and roller drive systems for food conveying.

BACKGROUND OF THE INVENTION

The state of the art discloses rollers and belt drive mechanisms as disclosed in U.S. Pat. Nos. 7,565,967B2, 6,811,018B2 and 4,685,557A.

U.S. Pat. No. 7,565,967B2 shows a conveyor belt system comprising a mesh belt constructed from rods and helical wire, and at least one rotating member or roller including a radially symmetrical cylindrical outer surface. This roller has parallelogram-shaped spaced protrusions on its surface, which engage with the holes in the mesh type belt. The rotating member includes a hollow tubular member and the outer cylindrical surface includes a plurality of openings towards the hollow tubular member. These openings prevent the accumulation of product on the rotating member and also on the mesh type belt. In addition, in one embodiment of the invention, the rotating member includes regions without protrusions, which allow maintaining roller rigidity.

On the other hand, U.S. Pat. No. 6,811,018B2 refers to an accumulation belt comprising at least two tandem zones, each consisting of a motorized roller and a rotating roller arranged in parallel and spaced so that a continuous belt is arranged around them in a strained manner. In addition, the accumulation belt includes a sensor to detect elements on the belt and a controlling means to operate at least one motorized roller in the tandem zones according to the information provided by the sensors. In one embodiment of the invention, the tandem zones include one or more support plates under the continuous belt to ensure its flatness and to prevent it from sagging under the weight of the elements it carries.

Regarding U.S. Pat. No. 4,685,557A, a conveyor belt drive system is shown, in which a roller is disclosed, consisting of toothed cylindrical segments arranged side by side in a coaxial manner. The material of the toothed cylindrical segments has a different thermal expansion coefficient than the material of the conveyor belt, insomuch as the toothed cylindrical segments expand and contract at a different speed than the conveyor belt when the temperature in the system varies. Moreover, U.S. Pat. No. 4,685,557A discloses that the cylindrical segment teeth are conical and their tips are flattened.

However, although the documents cited refer to rollers and belt drive mechanisms, they do not teach how to avoid longitudinal and transverse deformations in the belts, when these are transporting elements subjected to temperatures higher than the room temperature. Nor do these documents teach how to reduce the longitudinal and transversal strains in conveyor belts when they are coupled with toothed rollers.

BRIEF DESCRIPTION OF THE INVENTION

The present invention refers to a conveyor belt comprising a drive roller with a constant section cylinder and conical tip teeth, a mesh type drive belt, where said holes coincide with the teeth of the drive roller and a sliding plate, the drive belt being supported on the sliding plate.

Wherein the coupling between the drive belt and the teeth allows reducing the longitudinal and transversal strains of the mesh type drive belt.

DETAILED DESCRIPTION

The present invention corresponds to a drive roller (1) for a conveyor belt comprising a cylinder of constant section, and cylindrical teeth (2) arranged on the cylinder, where the teeth (2) have a conical tip (3).

Figure 4:
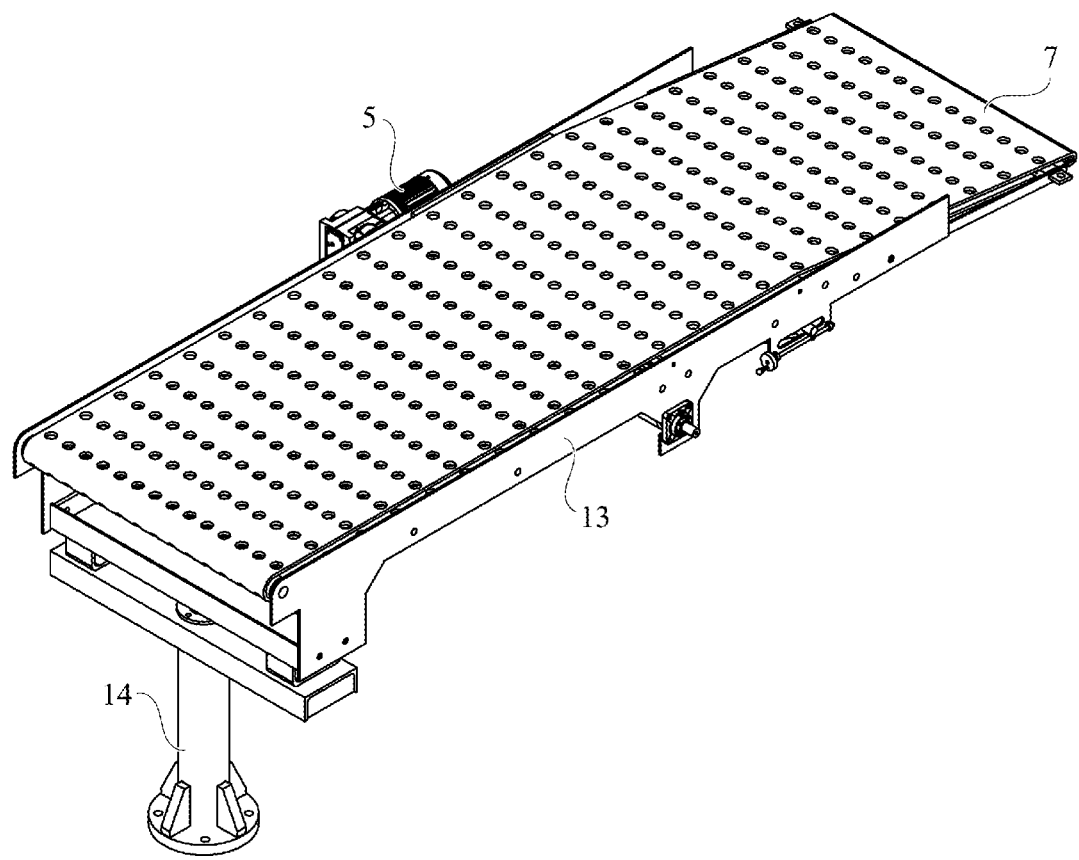
FIG. 4 corresponds to an isometric view of a conveyor belt embodiment.
Figure 5:
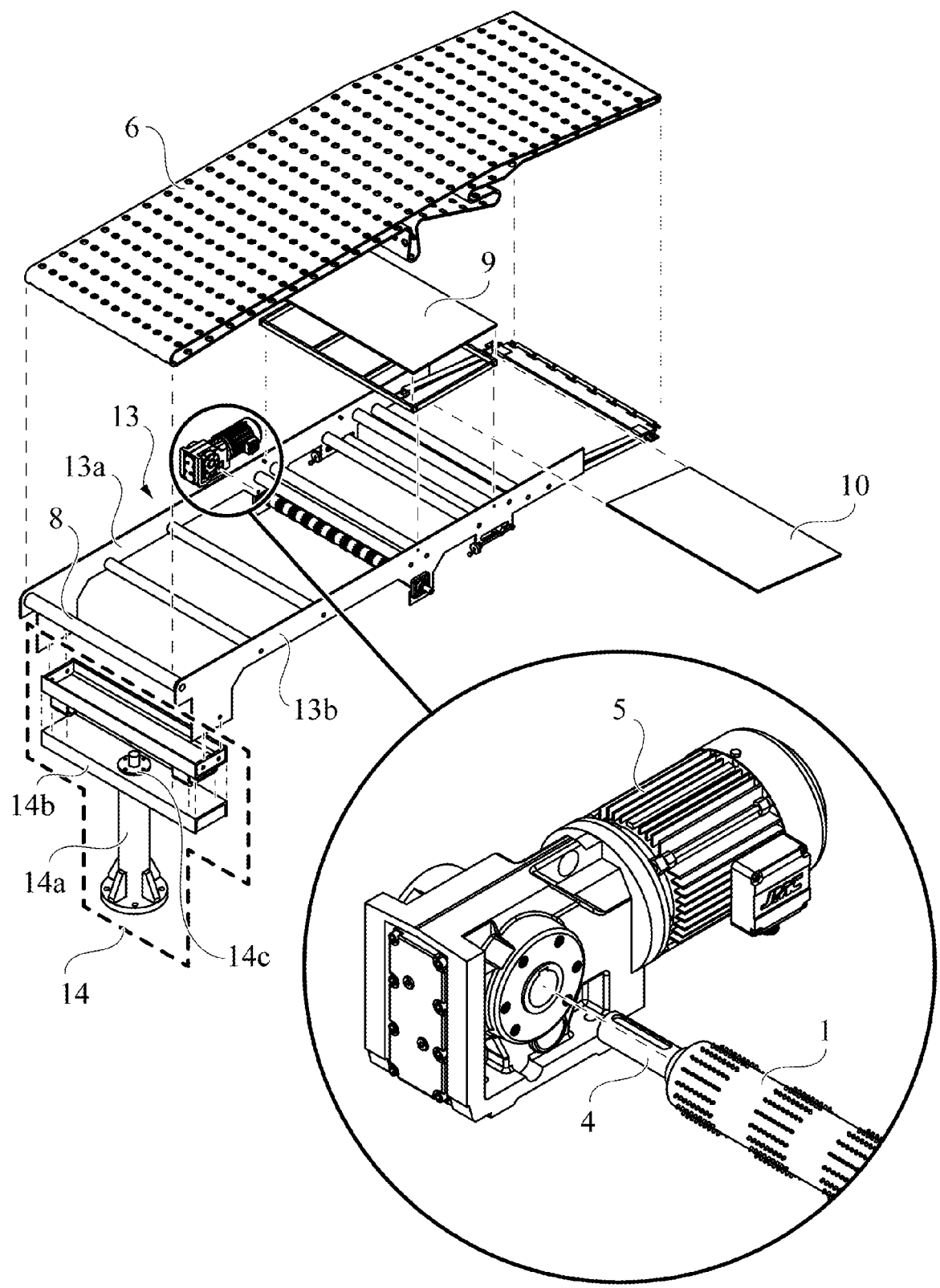
FIG. 5 corresponds to an exploding view of the conveyor belt in FIG. 4.

On the other hand, and referring to FIG. 4 and FIG. 5, the present invention also refers to a conveyor belt comprising a constant section drive roller (1) having conical tip teeth (2), a drive belt (6) of mesh type (7), the mesh (7) holes coincide with the teeth shape (2) of the drive roller (1). This conveyor belt also comprises a sliding roller (8) connected to the drive belt (6) and a sliding plate (9), where the sliding plate (9) supports the drive belt (6).

Figure 1:
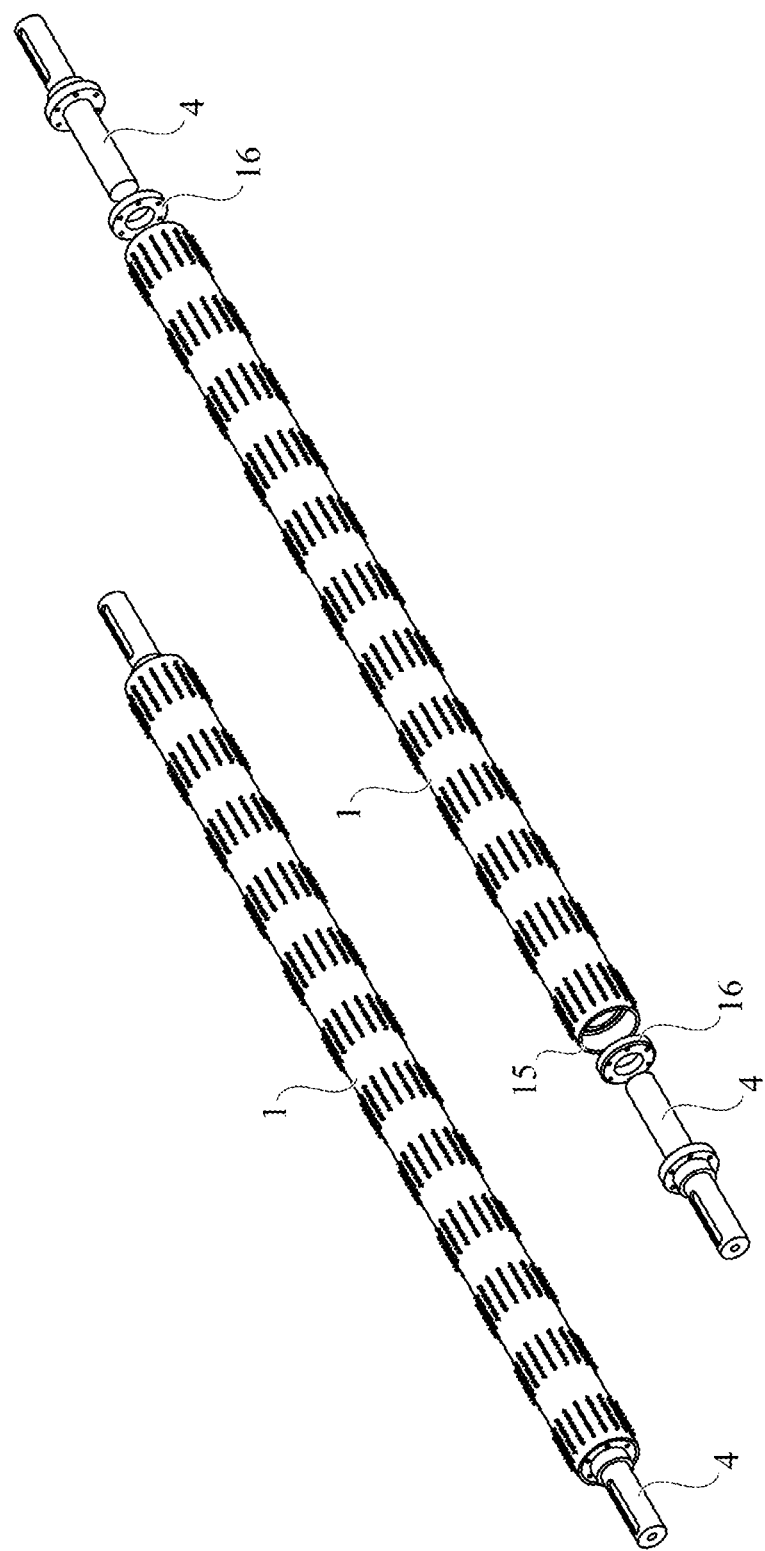
FIG. 1 corresponds to two isometric views of a single roller embodiment.
Figure 3:
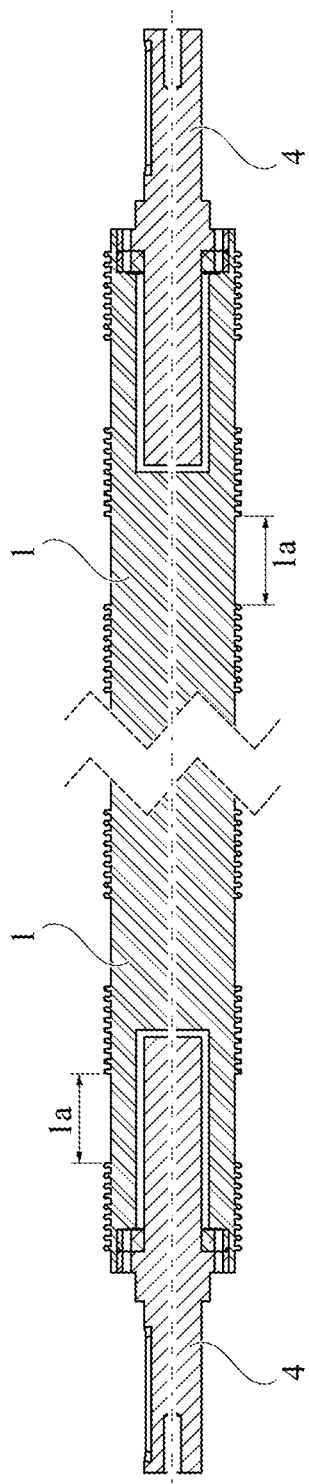
FIG. 3 corresponds to a longitudinal view of the roller in FIG. 1 and FIG. 2, which also shows a connecting element inserted in the ends of the roller.

This drive roller (1) is a cylinder with two ends, a first end and a second end, wherein the roller can be either hollow or solid. Referring to FIG. 1 and FIG. 3, the cross section of the drive roller (1) is constant, which allows the forces produced by a localized load on the roller to be uniformly distributed. In addition, the constant cross section of the drive roller (1) allows a drive belt (6) to sit on the roller without any rippling or strain, thus avoiding a change in the shape of a food or product on the drive belt (6).

For the present invention "food" or "product" means any substance, food, product, perishable element, pharmaceutical product, nutraceutical product, chemical or biological substance. The "food" in particular can be an element that loses its organoleptic, nutritional or active qualities over time due to exposure to substances in a gaseous state normally found in the atmosphere, such as oxygen, water steam, ethylene or carbon dioxide. Examples of perishable elements are: fruits, seeds, grains, vegetables, etc.

The cylinder of the drive roller (1) is preferably solid, which allows the deflection in the drive roller to be reduced when a load acts on it. In addition, the drive roller (1) can also be monolithic. This makes manufacturing easier and also reduces possible stresses that may be generated when joining various elements to form the roller. In other words, when the drive roller (1) is made up of several cylindrical and collinear sections, the joints of these sections may cause undesired stresses.

The material of the drive roller (1) may be metallic (e.g. carbon steel, stainless steel, nickel steel, molybdenum, chromium, vanadium, or combinations thereof), ceramic (e.g. concrete, metal reinforced concrete), aluminum, carbon steel, cast iron, galvanized iron, chrome steels, chrome-nickel steels, chrome-nickel-titanium steels, nickel-chrome-molybdenum-tungsten alloy, chrome-molybdenum ferrous alloys, 301 stainless steel, 302 stainless steel, 304 stainless steel, 316 stainless steel, 405 stainless steel, 410 stainless steel, 430 stainless steel, 442 stainless steel, manganese alloyed steel or a material permitted to be worked with foodstuffs.

On the other hand, the drive roller (1) has an external surface comprised of the constant section, wherein, on this external surface, a plurality of teeth is arranged (2). These teeth (2) have a base and a tip, wherein the base is arranged on the external surface of the drive roller (1), while the tip is the longitudinal end opposite the base of a tooth (2). These teeth (2) allow the holes of a mesh type (7) drive belt (6) to engage with them, allowing the drive roller (1) to transmit motion to the drive belt (6) as the drive roller (1) rotates. Additionally, these teeth (2) have a conical tip (3), which prevents the mesh (7) from being uncoupled from the drive roller (1), reducing longitudinal or transversal strains in the mesh type (7) drive belt (6). This in turn reduces undesirable movements or arrangements of the products or foods on the drive belt (6).

On the other hand, optionally the teeth (2) have a constant cross section, which allows reducing stress in the teeth (2) and, in addition, allows the correct coupling between the holes of the mesh type (7) drive belt (6) and these teeth (2). In one embodiment of the invention, and referring to FIG. 3, the teeth (2) have a constant cross section and a conical tip (3). This allows the links of the mesh type (7) drive belt (6) to be correctly positioned over the teeth (2), reducing strain on the belt.

When the teeth (2) have a constant cross section and the tip is a conical tip (3), the mesh type (7) drive belt (6) is coupled with the teeth (2), so that they have enough clearance to allow for reduction of strain in the mesh type (7) drive belt (6).

In addition, the cross section of a portion of the tooth (2) can be selected from the group formed by squares, triangles, circles, rectangles, pentagons, trapezoids, ellipses, rhombuses, hexagons, heptagons, octagons, decagons, equivalent shapes known to a moderately skilled artisan or a combination thereof.

On the other hand, the drive roller cylinder (1) and the teeth (2) form a monolithic body. In other words, the teeth (2) can be part of the same body as the drive roller (1). On the other hand, the teeth (2) can also be independent elements of the drive roller (1), which are connected to it by mechanical means such as screws or welding. In an embodiment of the invention, the teeth (2) have at their base a threaded cavity which is screwed to threaded protrusions of the drive roller (1). In another embodiment of the invention, the drive roller (1) has threaded cavities on its surface where the teeth (2) are screwed with threaded ends at their base.

Accordingly, when the teeth (2) wear out, the entire drive roller (1) does not need to be replaced, but instead, only the tooth (2) or teeth (2) showing greater wear and that might prevent the conveyor belt from working properly would be replaced. The drive roller (1) and the teeth (2) can be made of the same material or different materials. In an embodiment of the invention, the conical tip (3) of the teeth (2) is of a different material than the rest of the tooth (2) body, or they can show a coating allowing for increased teeth hardness (2).

In one embodiment of the invention, and referring to FIG. 1 and FIG. 3, the outer surface of the drive roller (1) has toothless areas (2). Accordingly, the external surface of said drive roller (1) is divided into sections wherein some sections of said surface comprise teeth (2), while the other section (1a) does not contain teeth (2). One of the technical effects of the above is to reduce the number of teeth (2) on the roller, thus reducing manufacturing costs.

Figure 2:
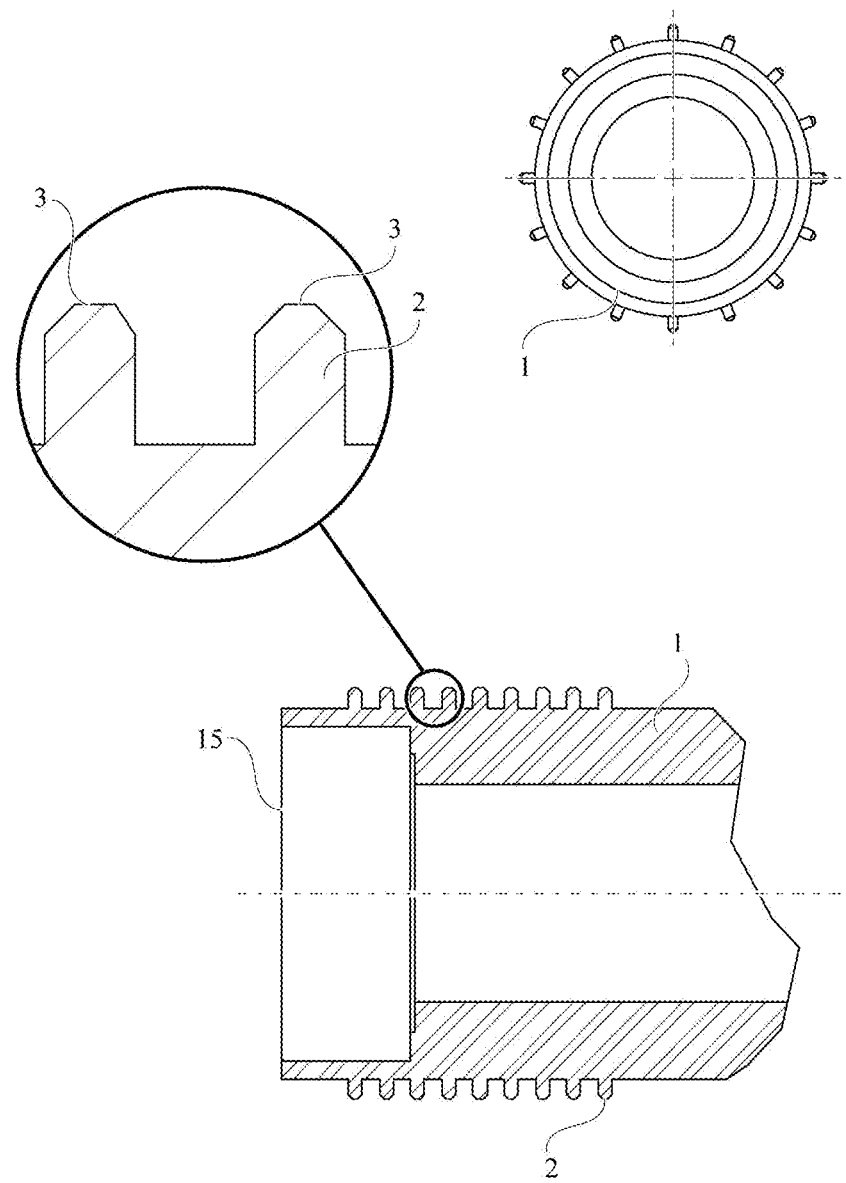
FIG. 2 corresponds to a cross-sectional and a longitudinal view of a toothed roller, wherein a detail of the roller tooth is also illustrated.

On the other hand, and referring to FIG. 2 and FIG. 3, the constant-section cylinder is solid, and one of its ends has a hole (15).

Referring to FIG. 1 and FIG. 3, when the drive roller (1) has a hole (15) at one of its ends, a connecting element (4) is inserted into this hole (15). For the understanding of the present invention, a connecting element (4) is understood to be an element with at least two ends, a first end and a second end. Where one of the ends of the connecting element (4) is inserted into the hole (15) of the drive roller (1) and, where the other end can be connected to a powered rotational mechanism (5). This provides a male-female connection between the connecting element (4) and the hole (15).

This connecting element (4) is shaped to match the hole (15) in the drive roller (1), allowing the connecting element (4) to be inserted into the hole (15). The connecting element (4) may be shaped as a pyramid, cone, disc, prism, cube, sphere, cuboid, parallelepiped, cylinder, hyperbole, equivalent shapes known to a normally skilled person and combinations thereof. In view of the above, the hole (15) in the drive roller (1) can be selected from one of the shapes described above.

Referring to FIG. 1 and FIG. 3 and in one embodiment of the invention, the hole (15) has at least two sections, where one section of the hole (15) has a larger proportion than the other section. Additionally, a connecting element, such as a flange (16) which is inserted in the hole (15), can be connected to the connecting element (4), which allows the connecting element (4) to be anchored to the drive roller (1) at the same time.

The flange (16) is secured to the drive roller (1) and the connecting element (4) by means of screws, pins, wedge pins or combinations thereof. In this way, both the drive roller (1) and the connecting element (4) can be separated, which is convenient for cleaning, inspection and maintenance work on the belt drive mechanism.

On the other hand, and referring to FIG. 5, as mentioned above, the connecting element (4) can be connected at one end to a powered rotary mechanism (5). This enhanced rotational mechanism (5) is a component which transmits rotational motion to the connecting element (4) and in turn transmits that motion to the drive roller (1). One of the technical effects of connecting a connecting element (4) to a power-driven rotary mechanism (5) is that, when desiring to change the power-driven rotary mechanism (5), it is not necessary to change the entire drive roller (1), but instead only the connecting element (4), which is inserted in the hole (15) of the drive roller (1), thus saving manufacturing costs and assembly times.

In one embodiment of the invention, the connecting element (4) is connected to the powered rotational mechanism (5) by means of a power drive mechanism, where said power drive mechanism is selected from the group formed by gears, drive chains, drive belts or bands, pulleys, toothed pulleys, gears, pinion and worm gears, pinion mechanisms, rack and pinion drives, friction wheels or discs, ribbed shafts, cardan joints and CV joints, camshafts, equivalent elements known to a normally skilled person, and combinations thereof.

On the other hand, the enhanced rotating mechanism (5) is selected from the group consisting of alternating current motors (e.g. three-phase synchronous motors, synchronous asynchronous motors, motors with a permanent magnet rotor, single-phase motors, two-phase motors, motors with auxiliary winding start and capacitor), direct current motors (e.g. serial excited motors, parallel excited motors, compound excited motors), crankshafts, motors with auxiliary winding starters and equivalent motors known to a normally skilled person.

One of the technical effects of having a connecting element (4) connected to a powered rotary mechanism (5) is to have only one drive roller (1), when this is a motor, and only having to change this connecting element (4) when the powered rotary mechanism (5) needs to be changed. This means it is not necessary to change the drive roller (1) when the powered rotary mechanism (5) needs to be changed, but rather only change the connecting element (4) inserted in the hole (15) of the drive roller (1).

When the powered rotating mechanism (5) is an electric motor, it is preferably connected to a speed reducer which allows the rotation speed of the drive roller (1) to be adjusted.

Wherein the speed reducer is selected from the group formed by: worm gear reducers, gear speed reducers, cycloidal reducers, planetary speed reducers, internal gear reducers, external gear reducers, equivalent reducers that are known to any normally skilled person, and combinations thereof.

Additionally, when the powered rotating mechanism (5) is a motor, instead of being connected to a speed reducer, it can be connected to a variable speed drive, which allows the motor speed to be changed and therefore the rotation speed of the drive roller (1) to be changed. Including a variable speed drive makes it possible to connect different types of motors given the drive allows different types of motors to be connected, such as three-phase motors from two-phase connections.

The variable speed drive is selected from the group made up of mechanical drives such as adjustable pitch drives, traction drives, frequency drives, drives for direct current motors, equivalent drives known to a moderately skilled person, and combinations thereof.

On the other hand, the present invention also refers to a conveyor belt comprising a constant section drive roller (1) having conical tip teeth (2), a mesh type (7) drive belt (6), the mesh (7) holes coinciding with the teeth shape (2) of the drive roller (1). This conveyor belt also comprises a sliding roller (8) connected to the drive belt (6) and a sliding plate (9), wherein the sliding plate (9) supports the drive belt (6).

Referring to FIG. 4 and FIG. 5, the drive belt (6) is a belt with holes, into which the teeth (2) of the drive roller (1) are inserted. Accordingly, when the drive roller (1) rotates, the rotational movement is transmitted to the drive belt (6) by the teeth (2) inserted in the holes of said drive belt that pull it in the direction of rotation.

Preferably, the drive belt (6) is of a metallic mesh type (7), which allows it to withstand baking type temperatures, without deformation of the belt (6). Additionally, the holes of the drive belt (6) coincide with the teeth (2) of the drive roller (1). This is because the tip of these teeth (2) is conical (3), allowing for coupling of the drive belt (6) with the teeth (2) without said teeth (2) deforming the drive belt (6).

When the drive belt (6) is a mesh (7), it is selected from the group formed by flat meshes, round meshes, mesh 3, mesh 4, mesh 5, mesh 6, mesh 7, mesh 8, mesh 10, mesh 12, mesh 14, mesh 16, mesh 18, mesh 20, mesh 25, mesh 30, mesh 35, mesh 40, mesh 45, mesh 50, mesh 60, mesh 70, mesh 80, mesh 90, mesh 100, mesh 120, mesh 140, mesh 170, mesh 200, mesh 230, mesh 270, mesh 325, mesh 400, mesh 500, mesh 600, equivalent types of mesh known to a moderately skilled person, and combinations thereof.

Each mesh (7) is represented by a number that indicates the number of threads crossed per square inch, for example: mesh number 8 has 8 vertical threads and 8 horizontal threads forming a grid per square inch. In addition, when the drive belt (6) is a mesh, the shape of the holes is selected from the group consisting of squares, triangles, circles, rectangles, pentagons, trapezoids, ellipses, rhombuses, hexagon, heptagon, octagon, decagon, equivalent shapes known to a moderately skilled person, and combinations thereof.

One of the technical effects of the mesh type (7) drive belt (6) hole shapes being equal to the cross section of the teeth (2) is that said teeth (2) engage without generating any load or friction that would strain the drive belt (6) or prematurely wear the teeth (2).

On the other hand, the material of the mesh type (7) drive belt (6) is selected from the group consisting of carbon steel, iron castings, galvanized iron, chrome steels, chrome-nickel steels, chrome-nickel-titanium steels, nickel-chrome-molybdenum-tungsten alloy, chrome-molybdenum ferrous alloys, 301 stainless steel, 302 stainless steel, 304 stainless steel, 316 stainless steel, 405 stainless steel, 410 stainless steel, 430 stainless steel, 442 stainless steel, manganese alloy steel, aluminum, food grade materials, and combinations thereof.

In one embodiment of the invention, the conveyor belt includes a frame (13), which supports the drive belt (6) and the drive roller (1). Said frame (13), allows supporting and damping the vibrations of the machine when said belt mechanism is in operation.

The frame (13) may consist of plates, sheets or slides, bars or profiles with an I-shape, C-shape, T-shape, profiles with a cross-section with a shape selected from the group consisting of squares, triangles, circles, rectangles, pentagons, trapezoids, ellipses, rhombuses, hexagons, heptagons, octagons, decagons and combinations thereof.

On the other hand, the frame material (13) is selected from the group consisting of carbon steel, cast iron, galvanized iron, chrome steels, chrome-nickel steels, chrome-nickel-titanium steels, nickel-chrome-molybdenum-tungsten alloy, chrome-molybdenum ferrous alloys, 301 stainless steel, 302 stainless steel, 304 stainless steel, 316 stainless steel, 405 stainless steel, 410 stainless steel, 430 stainless steel, 442 stainless steel, manganese alloy steel, aluminum, food grade materials, and combinations thereof.

Figure 6:
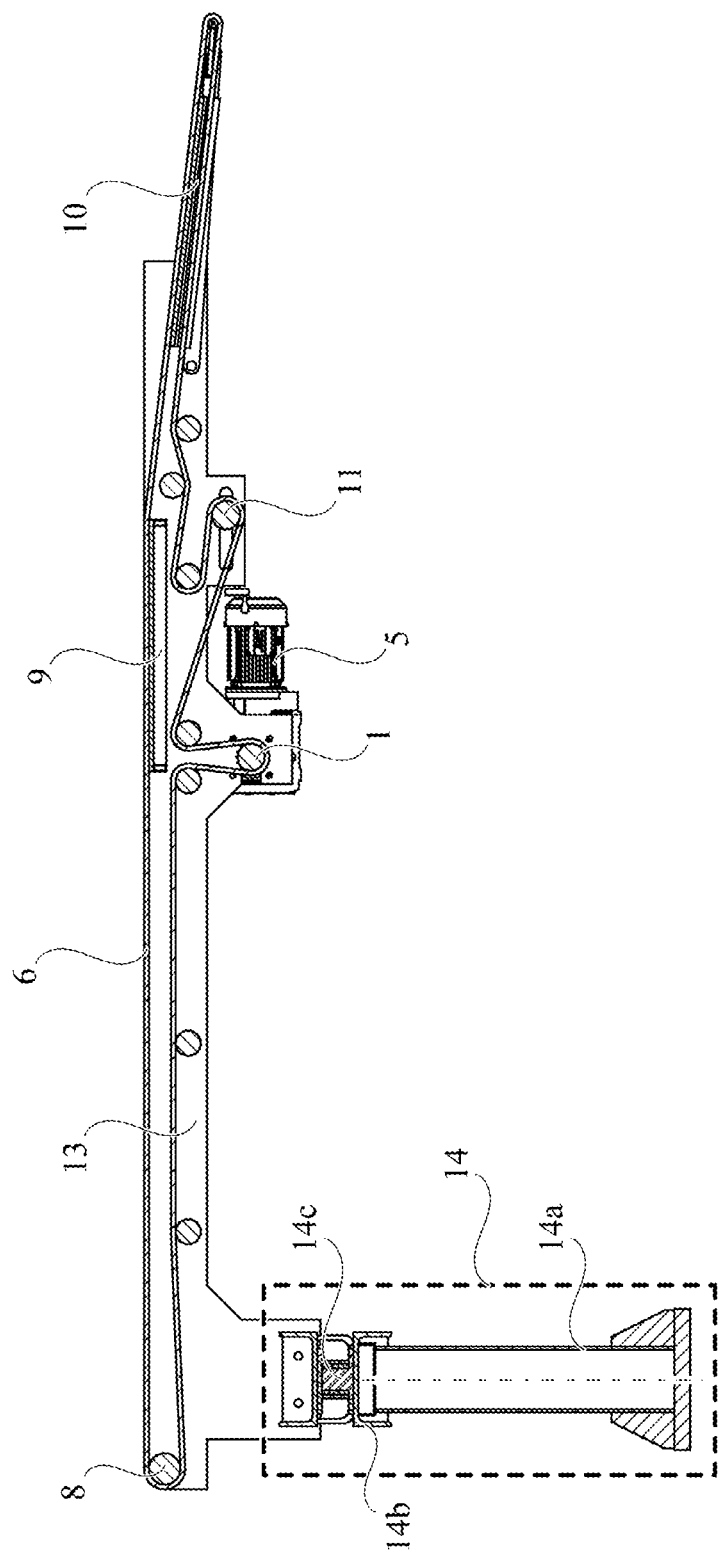
FIG. 6 corresponds to a side view of the conveyor belt in FIG. 4 and FIG. 5.

On the other hand, and referring to FIG. 5 and FIG. 6, the conveyor belt includes a sliding roller (8), which is in contact with the drive belt (6). This sliding roller (8) is preferably a cylindrical element with two ends, where the sliding roller has a smooth outer surface on which the drive belt (6) slides.

One of the technical effects of including a sliding roller (8) is to allow the drive belt (6) to slide on the smooth surface of the sliding roller (8) when the drive roller (1) has rotational movement. On the other hand, the drive roller (1) and the sliding roller (8) are preferably parallel, which allows the drive belt (6) to slide on both rollers, allowing the tension on the belt (6) to be uniform and not to be strained in sections.

Referring to FIG. 4, FIG. 5 and FIG. 6, the frame (13) includes two plates facing each other, a first plate (13a) and a second plate (13b). Each end of the drive roller (1) and the slide roller (8) are located on each of the plates (13a and 13b) respectively.

On the other hand, and referring to FIG. 5 and FIG. 6, there is a sliding plate (9) under the drive belt (6), where the sliding plate (9) supports the drive belt (6). Preferably, the sliding plate (9) has a flat surface, which allows the drive belt (6) to slide on this flat surface without strain. This prevents the product or food on the drive belt (6) from sliding on the belt or from rippling.

In one embodiment of the invention, the sliding plate (9) material may be polyamides (PA) (e.g. PA12, PA6, PA66); polychlorotrifluoroethylene (PCTFE); polyvinylidene fluoride (PVDF), reinforced with fibers (e.g. glass, aramid, polyester), polyamides (PA), PA12, PA6, PA66, polychlorotrifluoroethylene (PCTFE), ultrahigh molecular weight polyethylene (UHMWPE), polyvinylidene fluoride (PVDF), fiber reinforced (e.g. glass, aramid, polyester), polytetrafluoride ethylene (PTFE); ethylene-chlorotrifluoroethylene (ECTFE); plastics (polyester, vinylester, epoxy, vinyl resins), equivalent materials known to a normally skilled person, and combinations thereof.

Preferably, the sliding plate (9) is made of ultra-high molecular weight polyethylene (UHMWPE). One of the effects of the sliding plate (9) being made of UHMWPE is to allow the drive belt (6) to rub against the sliding plate (9) so that no material can come off the sliding plate (9). This is ideal if food is transported on the power drive belt (6) or other products that cannot be contaminated with other materials. In addition, the (UHMWPE) resists baking temperatures of food elements, such as cookies, without releasing contaminating chemicals or changing shape.

In addition, the sliding plate (9) may be in contact with a second plate (10). In one embodiment of the invention, the second plate (10) has a flat surface, which is superimposed with the flat surface of the sliding plate (9), which allows decreasing strain of the sliding plate (9) when the drive belt (6) is moving on it.

This second plate (10) can also be anchored to the frame (13), without the sliding plate (9) having contact with any mechanical connection element, which could contaminate any food or any substance on the drive belt (6).

In an embodiment of the invention, the second plate (10) is embedded in the sliding plate (9), thus strengthening the sliding plate (9) so that it does not undergo strain that could generate ripples on the drive belt (6).

Referring to FIG. 6, and in one embodiment of the invention, the conveyor belt comprises at least one additional roller under the second plate (10) but in contact with the drive belt (6). Wherein said roller is a cylinder which is connected at its ends to the frame (13), and allows the drive belt to be kept taut (6). Preferably the roller has a smooth surface, allowing the belt (6) to slide over it.

Furthermore, referring to FIG. 6, the conveyor belt optionally includes a tensioning roller (11), which allows for drive belt (6) tensioning, where the tensioning roller (11) can be a cylinder with two ends. When the drive belt (6) is supported on the frame (13), and the frame comprises two symmetrical parallel plates (13a and 13b), where each of these plates includes two symmetrical grooved guides. The ends of the tensioning roller (11) are arranged on each of these grooved guides, allowing the tensioning roller (11) to move on the guides and thus allowing the drive belt (6) to be tensioned.

On the other hand, and referring to FIG. 4, FIG. 5 and FIG. 6, the conveyor belt includes a frame (13), which includes two parallel plates with a grooved guide, where each of the ends of the drive roller (1) and the slide roller (8) are located on each of the parallel plates, respectively. On the other hand, the drive roller (1), the slide roller (8) and the tensioning roller (11) are parallel, which reduces drive belt strain (6).

Referring to FIG. 5 and FIG. 6, in one embodiment of the invention, the frame (13) is supported on a surface by a rotating mechanism (14). Such a rotating mechanism allows the conveyor belt to rotate in one plane. One of the technical effects of allowing the conveyor belt to rotate is to reduce stress produced in the frame (13), by means of a rotating mechanism when the frame is subject to external loads.

Preferably, and referring to FIG. 5 and FIG. 6, the rotating mechanism (14) consists of a column (14a) with two ends, one end resting on a surface, and the other end connected to a bar (14b). Wherein said bar (14b) can be connected orthogonally to the column (14a), and connected to it by a rotation element, which allows the bar (14b) to rotate with respect to the column (14a). Said bar (14b) is connected to the frame (13), and allows for the rotation element arranged with the bar (14b), to rotate the conveyor belt when the frame (13) rotates with respect to the column (14a).

Referring to FIG. 5, in one embodiment of the invention, the column (14a) includes a bearing which corresponds to the rotation element, and a housing which houses the bearing; the housing may be a support bracket, two-hole flange bracket, three-hole flange bracket, four-hole flange bracket and combinations thereof.

Said rotating element can be a bearing that is selected from the group consisting of deep groove ball bearings, spherical roller bearings, cylindrical roller bearings, conical roller bearings and axial ball bearings.

In one embodiment of the invention, the column (14a) is supported on a horizontal surface, where a second bar is connected to the bar (14b) which is coupled to the frame (13) by means of fastening elements such as screws, bolts, nuts, rivets, studs, pins, wedges, clamps, equivalent elements known to a normally skilled person, and combinations thereof.

One of the technical effects of the above is to uncouple the rotating mechanism (14) from the frame (13), and thus be able to move the drive belt (6) together with the frame (13) and the rollers for maintenance purposes or to arrange them in another space. For the understanding of the present invention, a direction or plane passing through a given point is horizontal if it is perpendicular to the direction of local gravity at that point.

Additionally, the conveyor belt can be connected to a second conveyor belt by means of a hinged mechanism. Wherein this second conveyor belt was connected to the conveyor belt in the frame (13). The second belt has a chassis, which is connected to the frame (13) by a hinged mechanism that includes a roller, which allows the conveyor belt, when it has a rotating mechanism (14), to move as the second belt.

On the other hand, this second conveyor belt is preferably located in an oven, allowing food products to be moved from the conveyor belt to the oven. Wherein, the temperature of the oven, by action of said temperature, allows said second belt to move, so the articulated mechanism allows the conveyor belt to move as the second belt. This allows the food product on the belts not to move.

Example 1

A solid cylindrical drive roller (1) was developed, which had a plurality of cylindrical teeth (2) on the external surface of the drive roller (1), wherein the tip of said teeth (2) was a conical (3), wherein the larger base of this conical tip (3) was arranged over the teeth (2) and opposite to the base of the tooth (2) in contact with the cylinder of the drive roller (1).

Example 2

The drive roller (1) of EXAMPLE 1 was developed, where the teeth (2) had a height of 2 mm to 7 mm, preferably a height of 4.79 mm with a diameter of 1 mm to 5 mm, preferably of 3.18 mm. Additionally, these teeth (2) had a conical tip (3) with a chamfer between 10° and 75l, preferably with a 45° chamfer.

The primitive diameter of said drive roller (1) was between 30 mm to 100 mm, preferably 66.24 mm, and the distance between teeth (2) was between 2 mm to 20 mm, preferably 7.26 mm apart. Said drive roller (1) was between 500 mm and 3000 mm long, with a preferred length of 1450 mm.

Example 3

Referring to FIG. 5, a conveyor belt was developed, comprising a constant section drive roller (1) having conically tipped (3) teeth (2), a mesh type (7) drive belt (6), wherein the holes of the mesh (7) coincide with the shape of the teeth (2) of the drive roller (1). This conveyor belt also comprised a sliding roller (8) connected to the drive belt (6) and a sliding plate (9), wherein the sliding plate (9) supported the drive belt (6).

This conveyor belt includes a frame (13), which supports the drive belt (6) and the drive roller (1). This frame (13) includes two parallel and symmetrical plates, a first plate (13a) and a second plate (13b). Wherein each end of the drive roller (1) and the ends of the sliding roller (8) were connected to each of the parallel plates (13a and 13b) of the frame (13), respectively. The drive roller (1) and the sliding roller (8) are parallel to one another.

Example 4

Referring to FIG. 5 and FIG. 6, a conveyor belt was developed as in EXAMPLE 3 where both the first plate (13a) and the second plate (13b) have a grooved guide. Additionally, this mechanism also included a tensioning roller (11), parallel to the drive roller (1). Each end of the tensioning roller (11) is located on the plate guides (13a and 13b) of the frame (13).

Additionally, the drive roller (1) has holes (15) at each end, wherein each end has a connecting element (4) connected to it. Both pins (4) are supported on the plates (13a and 13b) of the frame (13). Additionally, a powered rotary mechanism (5) is connected to one of the pins (4), which corresponded to an electric motor.

Example 5

Referring to FIG. 5, a conveyor belt was developed for continuous baking of food in a linear oven, as in EXAMPLE 4, which has a sliding plate (9) under the drive belt (6). Referring to FIG. 6, said conveyor belt includes a roller parallel to the drive roller (1), under the second plate (10) and in contact with the drive belt (6). Wherein this roller was a cylinder that is connected at its ends to the plates (13a and 13b) of the frame (13).

It should be understood that the present invention is not limited to the embodiments described and illustrated herein, given as will be evident to a normally skilled person, there are possible variations and modifications that do not depart from the spirit of the invention, which is only defined by the following claims.

The invention claimed is:

1. A drive roller for a conveyor belt, comprising:
   a cylinder of constant external diameter, with an external surface and a longitudinal distance, wherein said cylinder is solid; and
   cylindrical teeth arranged on the external surface of the cylinder, wherein the teeth have a constant cross section with a conical tip; wherein the external surface of the cylinder is divided into longitudinal sections, wherein a longitudinal section of said surface comprises teeth, while other longitudinal section does not contain teeth.

2. The roller of claim 1, wherein the cylinder and the teeth form a monolithic body.

3. The roller of claim 1, wherein the cylinder has two ends, wherein one of its ends has a concentrical hole.

4. The roller of claim 3, wherein a connecting element is located in the concentrical hole.

5. The roller of claim 4, wherein a powered rotary mechanism is connected to the connecting element.

6. A conveyor belt, comprising:
   a drive roller having a cylinder with a constant external diameter with an external surface, said cylinder is solid and, a cylindrical teeth arranged on the external surface of the cylinder, wherein the teeth have a constant cross section with a conical tip, the external surface of the cylinder is divided into longitudinal sections, and wherein a longitudinal section of said surface comprise teeth, while other longitudinal section does not contain teeth;
   a mesh type drive belt with holes, wherein the holes coincide with the teeth of the drive roller; and
   a sliding plate;
   wherein the drive belt is supported on the sliding plate.

7. The belt of claim 6, wherein the sliding plate material is selected from the group consisting of: polychlorotrifluoroethylene (PCTFE); polyvinylidene fluoride (PVDF); reinforced with fiber (glass, aramid, polyester; polyamides (PA), PA12, PA6, PA66; polychlorotrifluoroethylene (PCTFE); ultrahigh molecular weight polyethylene (UHMWPE); polyvinylidene fluoride (PVDF); polytetrafluoride ethylene (PTFE); ethylene-chlorotrifluoroethylene (ECTFE); plastics (polyester, vinylester, epoxy, vinyl resins), and combinations thereof.

8. The belt of claim 6, wherein the sliding plate is in contact with a second plate.

9. The belt of claim 6, wherein a tensioning roller is in contact with the drive belt, and allows the tensioning of the drive belt.

10. The belt of claim 6, wherein the drive belt is supported on a frame and this frame is in turn supported by a rotating mechanism.

* * * * *